US011078030B1

(12) United States Patent
Lu-Sullivan et al.

(10) Patent No.: US 11,078,030 B1
(45) Date of Patent: Aug. 3, 2021

(54) SYSTEM AND METHOD FOR AN ASSEMBLY LINE QUICK CHANGEOUT FIXTURE

(71) Applicant: Honda Motor Co., Ltd., Tokyo (JP)

(72) Inventors: Blanche Lin Lu-Sullivan, Toronto (CA); Steven William Albert Goymour, Alliston (CA); Hussein Ajram, Aurora (CA); Jefferson Pickers, Barrie (CA)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/782,216

(22) Filed: Feb. 5, 2020

(51) Int. Cl.
*B65G 47/61* (2006.01)
*B65G 17/20* (2006.01)
*B65G 17/44* (2006.01)

(52) U.S. Cl.
CPC ............ *B65G 47/61* (2013.01); *B65G 17/20* (2013.01); *B65G 17/44* (2013.01); *B65G 2201/02* (2013.01)

(58) Field of Classification Search
CPC .... B65G 47/61; B65G 2201/02; B65G 17/42; B65G 17/44; B65G 17/20
USPC ................ 198/465.4, 473.1, 867.01–867.15
See application file for complete search history.

(56) References Cited

U.S. PATENT DOCUMENTS 1,312,417 A * 8/1919 Mosher ................ B65G 17/20 105/155
2,830,694 A * 4/1958 Zebarth ................ B65G 17/20 198/687
3,148,765 A 9/1964 Weiss et al.
3,944,058 A * 3/1976 Strauss .................... B60P 1/28 198/377.07
4,501,351 A * 2/1985 Tracy .................... B65G 17/32 198/803.12
4,930,620 A * 6/1990 Springman ............ B65G 17/32 198/803.12
5,595,281 A * 1/1997 Mabrey ................. B65G 17/20 198/687.1
6,615,974 B2 * 9/2003 Scholz .................. B65G 17/42 198/706
7,195,552 B1 * 3/2007 Johnson ............... A22C 15/001 452/51
8,360,231 B2 * 1/2013 Yamamoto ........ A61F 13/15764 198/623
2008/0073181 A1 * 3/2008 Henderson ............ B65G 17/44 198/728
2019/0185086 A1 * 6/2019 Jung ..................... B65G 17/32

FOREIGN PATENT DOCUMENTS

CN 103448835 B 1/2017
JP 5504870 B2 5/2014
KR 0164330 B1 2/1999

* cited by examiner

*Primary Examiner* — Mark A Deuble
(74) *Attorney, Agent, or Firm* — Armstrong Teasdale LLP

(57) ABSTRACT

A conveyor hanger assembly includes an upper fastening end configured to mechanically couple to a conveyor, a lower fastening end configured to couple to an assembly component carrier, and a locking assembly including a locking body extending in longitudinal alignment with and between the upper fastening end and the lower fastening end, and a locking collar positionable between a locked position and an unlocked positioned.

18 Claims, 5 Drawing Sheets

600
602
606
608

122
112
305
604
100
300
100

SYSTEM AND METHOD FOR AN ASSEMBLY LINE QUICK CHANGEOUT FIXTURE

FIELD

The field of the disclosure relates generally to and more particularly to systems and methods for quick-changing component conveyor carriers during manufacturing.

BACKGROUND

At least some production or assembly lines employ conveyors to transport components, also referred to as conveyor carrier components, between different stations of the production line. Some known conveyors are mounted to an overhead rail, and roll along that rail to move components between stations on the production line. During vehicle manufacturing, it is necessary to periodically changeover from a first lineup of conveyor carrier components to a second lineup of conveyor carrier components. Such changeover may be necessary when the assembly line is switched from producing one type of component, such as a model of automobile to another model of automobile.

During a change-over, portions of the conveyor may need to be replaced or modified in order to transport the second lineup of conveyor carrier components. For example, a first component hanger designed to hold the first lineup of conveyor carrier components may need to be removed and replaced with a second component hanger designed to hold the second lineup of conveyor carrier components. Typically, the component hanger is bolted to the conveyor. To replace the first component hanger, the bolt is removed, the second component hanger is positioned with respect to the conveyor, and a bolt is again used to couple the second component hanger together with the conveyor. In addition, tightening of the bolt, or bolt and nut combination, may need to be verified with a torque wrench or other torque measuring device to comply with safety specifications.

Moreover, during the change-over, the production or assembly line is not producing the product it was intended to produce, therefore the production or assembly line is not producing revenue. Minimizing production or assembly line downtime is a much sought after goal. One way to minimize downtime is to make the change-over process simpler and less costly.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a conveyor hanger assembly includes an upper fastening end configured to mechanically couple to a conveyor, a lower fastening end configured to couple to an assembly component carrier, and a locking assembly including a locking body extending in longitudinal alignment with and between the upper fastening end and the lower fastening end, and a locking collar positionable between a locked position and an unlocked positioned.

In another aspect, a method of quick changeout of a conveyor carrier includes receiving a first assembly component carrier to be removed from a conveyor, translating a locking collar of a conveyor hanger assembly longitudinally away from the first assembly component carrier thereby releasing a locking assembly. The method further includes pivoting the assembly component carrier approximately 90° with respect to the conveyor hanger assembly, and disengaging the assembly component carrier from a lower fastening end of the conveyor hanger assembly.

In yet another aspect, an assembly line includes a conveyor for moving an assembly from a first point to a second point along the assembly line and a conveyor hanger assembly. The conveyor hanger assembly includes an upper fastening end configured to mechanically couple to a conveyor, a lower fastening end configured to couple to an assembly component carrier, and a locking assembly. The locking assembly includes a locking body extending in longitudinal alignment with and between the upper fastening end and the lower fastening end. The locking assembly also includes a locking collar positionable between a locked position and an unlocked positioned.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

FIG. 1 is a perspective view of a conveyor hanger assembly in a first locked position.

FIG. 2 is a perspective view of the conveyor hanger assembly in a second unlocked or released position.

FIG. 3 is a perspective view of an assembly component carrier that may be used with conveyor hanger assembly.

FIG. 4 is a perspective view of the assembly component carrier in the process of being installed on conveyor hanger assembly.

FIG. 5 is a flowchart of an example method for a quick change-out of a conveyor carrier, such as, an assembly component carrier on an assembly line conveyor.

FIG. 6 is a side elevation view of an assembly line and conveyor system that may be used with the conveyor hanger assembly shown in FIG. 1.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to realigning a conveyor system for a quick changeover between a first assembly process and a second assembly process.

Embodiments of an assembly line conveyor quick change-over apparatus and method of affecting a quick change-over are described herein. When a conveyor assembly line system is shutdown to change-over to, for example, a new model of an assembly, time to complete the change-over is of the essence. Expenditure of labor resources is also tightly controlled. Consequently, to meet these competing goals, tool-less hardware and simpler change-over processes are needed. The presently disclosed conveyor hanger assembly is operable during a change-over to replace a first assembly component carrier with a second assembly component carrier without tools. The conveyor hanger assembly positively captures the assembly component carrier using a locking assembly having a multiple step locking feature.

The following description refers to the accompanying drawings, in which, in the absence of a contrary representation, the same numbers in different drawings represent similar elements.

Figures 1, 2:
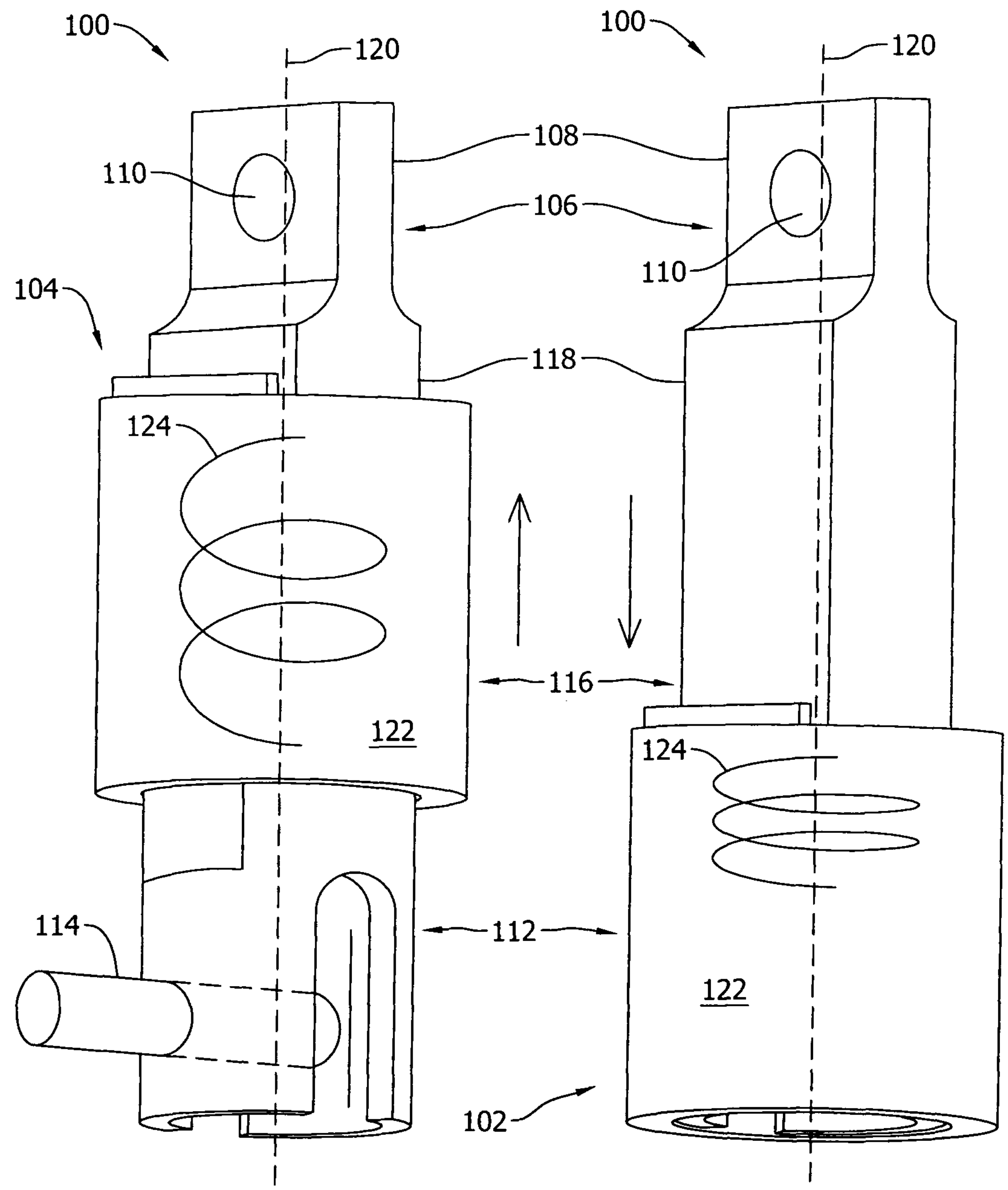
FIGS. 1-6 show example embodiments of the method and system described herein.

FIG. 1 is a perspective view of a conveyor hanger assembly 100 in a first locked position 102. FIG. 2 is a perspective view of conveyor hanger assembly 100 in a second unlocked or released position 104. In the example embodiment, conveyor hanger assembly 100 includes an upper fastening end 106 configured to mechanically couple to a conveyor (not shown). In various embodiments, upper fastening end includes a longitudinally extending tab 108 having an aperture 110 therethrough. Tab 108 is configured to be received in a complementary slot in the conveyor (not shown). A lower fastening end 112 is configured to couple to an assembly component carrier (shown in FIG. 3). In various embodiments, lower fastening end 112 and the assembly component carrier (shown in FIG. 3) are coupled together in a pivot joint (shown in FIG. 4), in which lower fastening end 112 includes a pin 114 configured to receive an assembly component carrier hook (shown in FIG. 3). A locking assembly 116 includes a locking body 118 extending along a longitudinal axis 120 in substantial alignment with and between upper fastening end 106 and lower fastening end 112. A locking collar 122 at least partially surrounds locking body 118 and is positionable between locked position 102 and unlocked position 104 by translating locking collar 122 longitudinally along locking body 118. Locking collar 122 may be biased to locked position 102, for example, by a spring 124 or other resilient material or other structure, such as magnets. Alternatively, or in combination, locking collar 122 may be biased to locked position 102 by the weight of locking collar 122 (i.e., gravity pulls locking collar 122 toward locked position 102).

Figure 3:
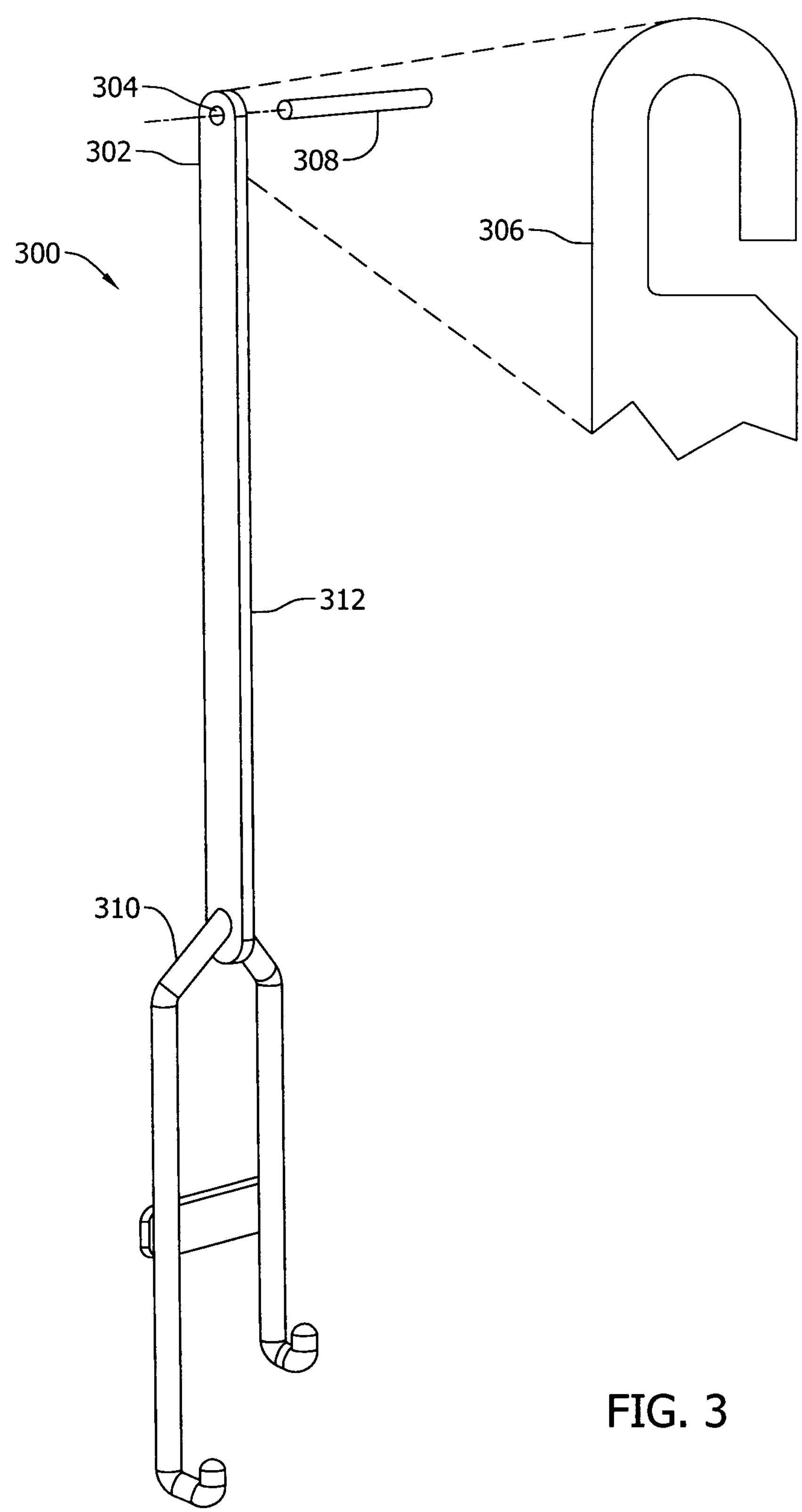

FIG. 3 is a perspective view of an assembly component carrier 300 that may be used with conveyor hanger assembly 100. In the example embodiment, assembly component carrier 300 includes a conveyor hanger engagement end 302, which may be formed with an aperture 304 or an assembly component carrier hook 306. When formed with aperture 304, assembly component carrier 300 may be secured to lower fastening end 112 using a locking pin 308, such as, for example, a lynch pin or hitch pin. When formed as a pivot joint 305 (shown in FIG. 6) with assembly component carrier hook 306, assembly component carrier 300 may be secured to lower fastening end 112 using locking assembly 116. Assembly component carrier 300 also includes a component hanger 310 and an elongate body 312 extending between component hanger 310 and conveyor hanger engagement end 302. Assembly component carrier 300 is configured to engage pin 114 when assembly component carrier 300 is positioned at an angle 314 of approximately 90° with respect to lower fastening end 112.

Figure 4:
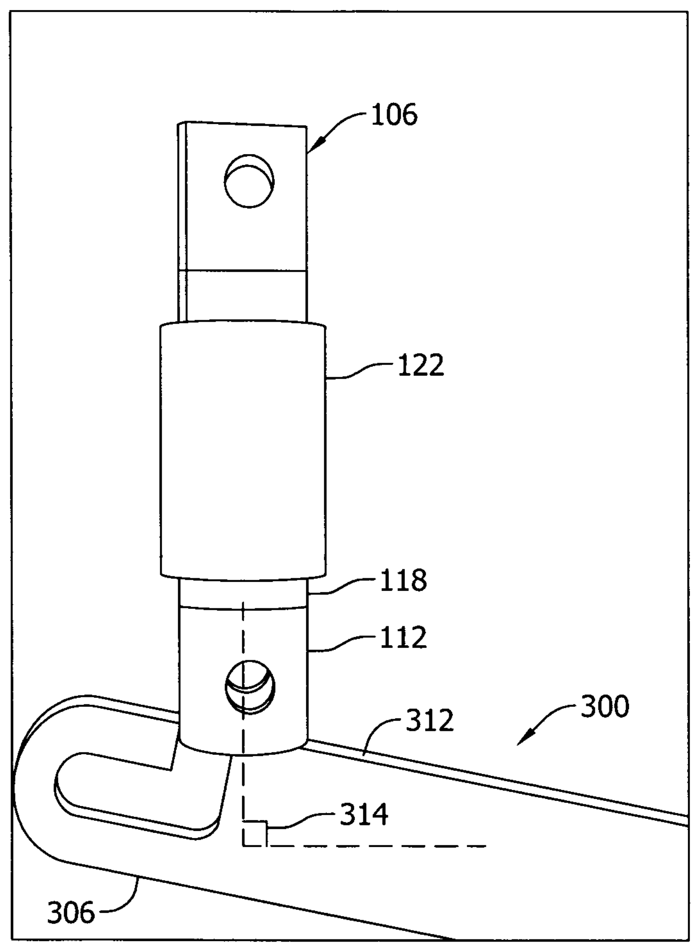

FIG. 4 is a perspective view of assembly component carrier 300 in the process of being installed on conveyor hanger assembly 100. In the example embodiment, a force is applied to locking collar 122 to overcome the bias of spring 124 permitting assembly component carrier 300 to be pivoted 90° with respect to conveyor hanger assembly 100. Assembly component carrier hook 306 is then able to be disengaged from pin 114 and lowered from lower fastening end 112 for removal. To reinstall a second replacement assembly component carrier 300, the process is reversed.

Figure 5:
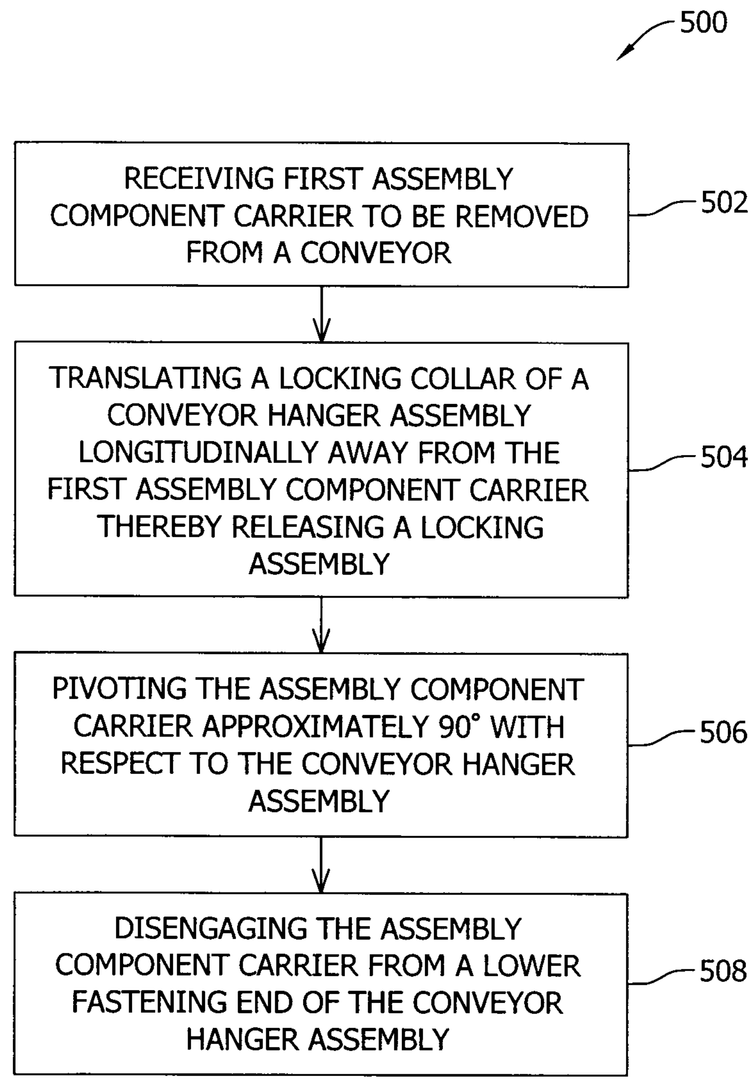

FIG. 5 is a flowchart of an example method 500 for a quick change-over of a conveyor carrier, such as, an assembly component carrier on an assembly line conveyor. In the example embodiment, method 500 includes receiving 502 a first assembly component carrier to be removed from a conveyor, translating 504 a locking collar of a conveyor hanger assembly longitudinally away from the first assembly component carrier thereby releasing a locking assembly, pivoting 506 the assembly component carrier approximately 90° with respect to the conveyor hanger assembly, and disengaging 508 the assembly component carrier from a lower fastening end of the conveyor hanger assembly.

Optionally, method 500 may include receiving a second assembly component carrier to be installed on the conveyor, and engaging the assembly component carrier on the lower fastening end of the conveyor hanger assembly at an approximate 90° angle 314 with respect to the conveyor hanger assembly. In various embodiments, assembly component carrier hook 306 of the assembly component carrier is engaged to a pin of the lower fastening end. Method 500 further may include pivoting the assembly component carrier into longitudinal alignment with the conveyor hanger assembly, and translating the locking collar longitudinally toward the first assembly component carrier thereby engaging the locking assembly. In various embodiments, translating the locking collar includes permitting the bias member to translate the locking collar into a locked position on the conveyor hanger assembly.

Figure 6:
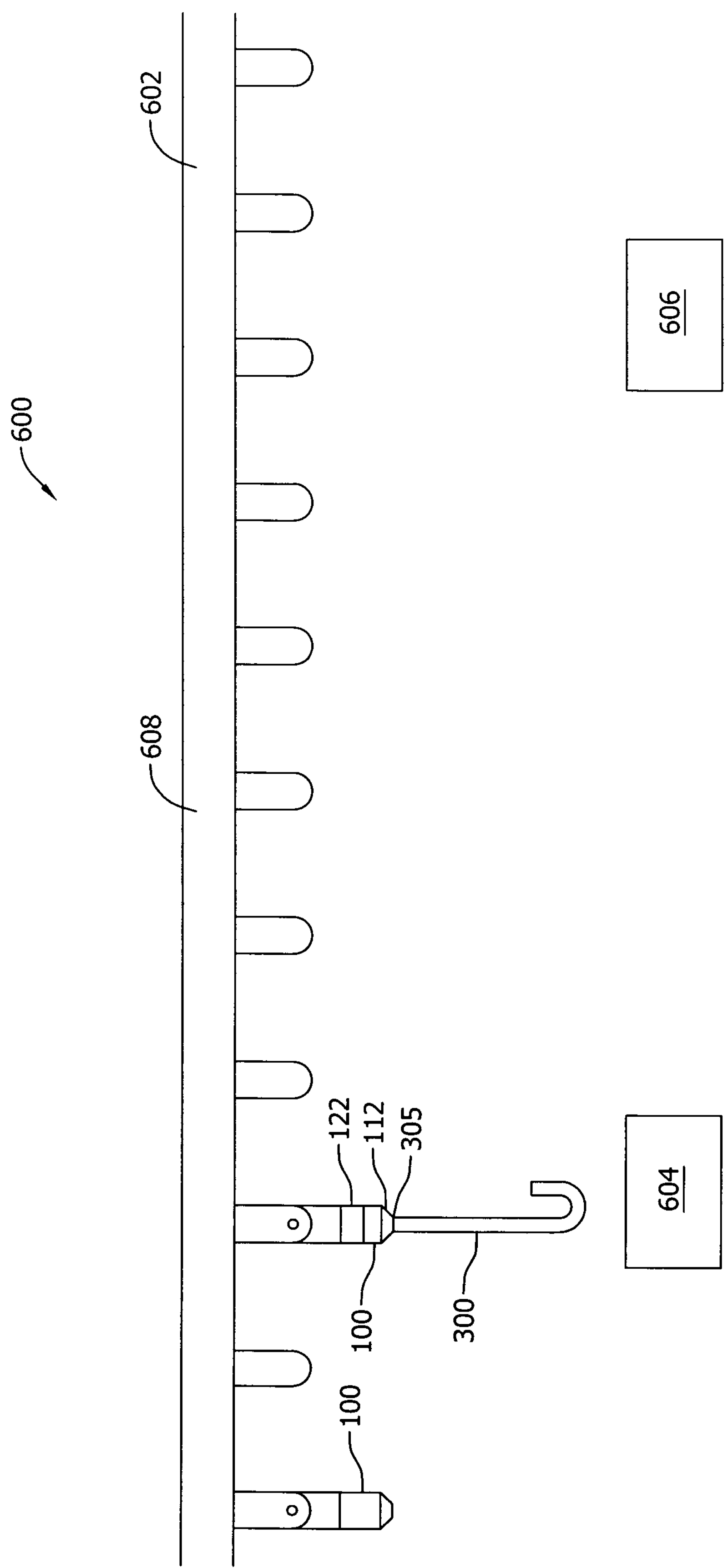

FIG. 6 is a side elevation view of an assembly line 600 and conveyor system 602 that may be used with conveyor hanger assembly 100 and assembly component carrier 300. In the example embodiment, conveyor system 602 is configured to transport components, also referred to as conveyor carrier components, between different stations of the assembly line, such as, a Station I 604 and a Station II 606. Some known conveyor hanger assemblies 100 are mounted to a horizontal rail 608, and roll along rail 608 to move components between stations 604, 606 on assembly line 600. Conveyor hanger assembly 100 includes lower fastening end 112 that is configured to couple to assembly component carrier 300. In various embodiments, lower fastening end 112 and the assembly component carrier 300 are coupled together in pivot joint 305, in which lower fastening end 112 includes pin 114.

The foregoing detailed description illustrates embodiments of the disclosure by way of example and not by way of limitation. It is contemplated that the disclosure has general application to quick-changing of conveyor hangers on an assembly line and in other commercial and industrial environments. It is further contemplated that the methods and systems described herein may be incorporated into existing assembly lines, in addition to being maintained as a separate stand-alone quick-changing securement capability.

The above-described embodiments of a method and system of quick-changing of conveyor hangers on an assembly line provides a cost-effective and reliable means for using a double locking conveyor hanger assembly More specifically, the methods and systems described herein facilitate reducing an amount of time it takes to change-out a conveyor hanger assembly of a first type for conveying a first type of component along an assembly line to a conveyor hanger assembly of a second type. Instead of unbolting and rebolting the conveyor hanger assemblies being changed-out, the conveyor hanger assembly uses a biased locking collar to secure a pivot connection that holds a component carrier to the conveyor hanger assembly. As a result, the methods and systems described herein facilitate quick-changing of conveyor hanger assemblies on an assembly line in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A conveyor hanger assembly comprising:
- an upper fastening end configured to mechanically couple to a conveyor, said upper fastening end comprising a longitudinally-extending tab having an aperture therethrough, said tab sized and oriented to be received in a complementary-shaped slot defined in the conveyor;
- a lower fastening end configured to couple to an assembly component carrier; and
- a locking assembly comprising:
  - a locking body extending in longitudinal alignment with and between said upper fastening end and said lower fastening end; and
  - a locking collar positionable between a locked position and an unlocked positioned.

2. The conveyor hanger assembly of claim 1, wherein said locking collar at least partially surrounds said locking body.

3. The conveyor hanger assembly of claim 1, wherein said locking collar is translatable longitudinally along said locking body.

4. The conveyor hanger assembly of claim 1, wherein said locking collar is biased in the locked position.

5. The conveyor hanger assembly of claim 1, wherein said lower fastening end is configured to couple to the assembly component carrier in a pivot joint.

6. The conveyor hanger assembly of claim 1, wherein said lower fastening end comprises a pin configured to receive a hook of the assembly component carrier.

7. The conveyor hanger assembly of claim 6 further comprising the assembly component carrier, wherein said assembly component carrier hook is configured to engage said pin when said assembly component carrier is positioned at an angle of approximately 90° with respect to said lower fastening end.

8. A method of changing a conveyor carrier, the method comprising:
- receiving a first assembly component carrier to be removed from a conveyor;
- translating a locking collar of a conveyor hanger assembly longitudinally away from the first assembly component carrier thereby releasing a locking assembly;
- pivoting the first assembly component carrier with respect to the conveyor hanger assembly; and
- disengaging the first assembly component carrier from a lower fastening end of the conveyor hanger assembly.

9. The method of claim 8, further comprising:
- receiving a second assembly component carrier to be installed on the conveyor;
- engaging the second assembly component carrier on the lower fastening end of the conveyor hanger assembly;
- pivoting the second assembly component carrier into longitudinal alignment with the conveyor hanger assembly; and
- translating the locking collar longitudinally toward the second assembly component carrier thereby engaging the locking assembly.

10. The method of claim 9, wherein engaging the second assembly component carrier comprises engaging a hook of the second assembly component carrier to a pin of the lower fastening end.

11. The method of claim 9, wherein translating the locking collar comprises permitting a bias member to translate the locking collar into a locked position on the conveyor hanger assembly.

12. An assembly line comprising:
- a conveyor for moving an assembly from a first point to a second point along the assembly line;
- an assembly component carrier configured to support an assembly component being transported along the conveyor; and
- a conveyor hanger assembly comprising:
  - an upper fastening end configured to mechanically couple to said conveyor, wherein said upper fastening end comprises a longitudinally-extending tab having an aperture therethrough, said tab sized and oriented to be received in a complementary-shaped slot defined in said conveyor;
  - a lower fastening end configured to couple to the assembly component carrier; and
  - a locking assembly comprising:
    - a locking body extending in longitudinal alignment with and between said upper fastening end and said lower fastening end; and
    - a locking collar positionable between a locked position and an unlocked positioned.

13. The assembly line of claim 12, wherein said locking collar at least partially surrounds said locking body.

14. The assembly line of claim 12, wherein said locking collar is translatable longitudinally along said locking body.

15. The assembly line of claim 12, wherein said locking collar is biased in the locked position.

16. The assembly line of claim 12, wherein said lower fastening end and said assembly component carrier are coupled together in a pivot joint.

17. The assembly line of claim 12, wherein said lower fastening end comprises a pin configured to receive an assembly component carrier hook.

18. The assembly line of claim 17, wherein said assembly component carrier hook is configured to engage said pin when said assembly component carrier is positioned at an angle of approximately 90° with respect to said lower fastening end.

* * * * *